United States Patent [19]
Wilson et al.

[11] Patent Number: 5,783,165
[45] Date of Patent: Jul. 21, 1998

[54] METHOD OF MAKING BARIUM TITANATE

[75] Inventors: James M. Wilson, Victor; Walter J. Symes, Dundee, both of N.Y.

[73] Assignee: Ferro Corporation, Cleveland, Ohio

[21] Appl. No.: 780,497

[22] Filed: Jan. 8, 1997

[51] Int. Cl.$^6$ .................................................. C01G 23/00
[52] U.S. Cl. .......................................... 423/598; 501/137
[58] Field of Search ............................ 423/598; 501/137

[56] References Cited

U.S. PATENT DOCUMENTS

| | | | |
|---|---|---|---|
| 3,330,697 | 7/1967 | Pechini | 117/215 |
| 4,019,915 | 4/1977 | Miyauchi et al. | 106/73.31 |
| 4,065,544 | 12/1977 | Hamling et al. | 423/252 |
| 4,520,004 | 5/1985 | Uedaira et al. | 423/598 |
| 4,534,956 | 8/1985 | Arendt et al. | 423/598 |
| 4,606,906 | 8/1986 | Ritter et al. | 423/598 |
| 4,643,984 | 2/1987 | Abe et al. | 501/134 |
| 4,670,243 | 6/1987 | Wilson et al. | 423/598 |
| 4,749,664 | 6/1988 | Ross et al. | 501/1 |
| 4,814,221 | 3/1989 | Utsumi | 428/220 |
| 5,009,876 | 4/1991 | Hennings et al. | 423/598 |
| 5,057,478 | 10/1991 | Abe et al. | 502/159 |
| 5,324,404 | 6/1994 | Ott et al. | 204/181.7 |
| 5,468,427 | 11/1995 | Stangle et al. | 264/3.4 |
| 5,571,767 | 11/1996 | Wilson et al. | 501/139 |

OTHER PUBLICATIONS

Clabaugh et al., "Preparation of Barium Titanyl Oxalate Tetrahydrate for Conversion to Barium Titanate of High Purity," Journal of Research of the National Bureau of Standards, vol. 56, No. 5, May 1956, pp. 289–291.

Chen et al., "Ferroelectric Ceramics—The Sol–Gel Method Versus Conventional Processing," Mat. Res. Soc. Symp. Proc., vol. 32 (1984), pp. 169–174, Elsevier Science Publishing Co., Inc.

Mazdiyasni et al., "Preparation of High–Purity Submicron Barium Titanate Powders," Journal of The American Ceramic Society, vol. 52, No. 10, Oct. 21, 1969, pp. 523–526.

Roth et al., "Alkoxide Precursor Synthesis and Characterization of Phases in the Barium–Titanium Oxide System," J. Am. Ceram. Soc., vol. 69, No. 2, pp. 155–162.

*Primary Examiner*—Anthony Green
*Attorney, Agent, or Firm*—Rankin, Hill, Porter & Clark LLP

[57] ABSTRACT

The present invention provides a new and improved method of making barium titanate powder. The method includes the steps of providing a solution comprising oxalic acid and titanium oxychloride, maintaining the solution at a predetermined temperature, adding barium carbonate to the solution thereby precipitating barium titanyl oxalate, and calcining the barium titanyl oxalate so as to provide the barium titanate powder.

11 Claims, 9 Drawing Sheets

30°C

30°C

40°C

50°C

60°C

70°C

75°C

80°C

90°C

METHOD OF MAKING BARIUM TITANATE

FIELD OF THE INVENTION

This invention relates to a method of making barium titanate. More particularly, the invention provides a new and improved method of making barium titanate powders by the pyrolysis of barium titanyl oxalate.

BACKGROUND OF THE INVENTION

Barium titanate powders are used extensively in the manufacture of electronic components or devices such as capacitors and thermistors. It is well-known by those practiced in the art that barium titanate can be manufactured via the solid state reaction of an intimate mixture of barium carbonate and titanium dioxide ($TiO_2$) at elevated temperatures (i.e., over about 1000° C.). Materials produced in this manner tend to yield powders with large (over 1 μm) and nonuniform grains. It is also very difficult to maintain absolute homogeneity in the barium carbonate/titanium dioxide mixture thus increasing the likelihood of variations in particle to particle stoichiometry. It is also known that the large and irregular morphology of barium titanate particles produced in this manner must be physically reduced in particle size to become useful in the manufacture of electronic ceramic components such as multilayer ceramic capacitors, varistors and resistors. As the trend in electronic circuitry continues towards further and further miniaturization, the demand for not only finer and more uniform titanate powders has increased tremendously, but the need for purity and stoichiometric uniformity has also escalated as well. Postcalcination pulverization/de-agglomeration of the coarse barium titanate powders not only introduces undesirable impurities, but the very high energy input required can alter the crystal habit of the material making it a less desirable material for the above mentioned components.

Another method for the production of barium titanate is presented in Wilson U.S. Pat. No. 4,670,243. This method produces a very fine, very uniform barium titanate with extremely tight stoichiometric control. This process does, however, require the use of expensive tetra-isopropyl titanate as a precursor. As well as being somewhat expensive to manufacture, the tetra-isopropyl titanate can be a difficult raw material to work with due to its propensity to absorb atmospheric moisture thus hydrolyzing the titanium dioxide. Further, it can be difficult to completely remove the alkaline salts produced during the precipitation process due to the inherent problems associated with filtering extremely fine powders.

Various other methods, such as those disclosed in U.S. Pat. Nos. 3,330,697 and 4,534,956, as well as others such as sol-gel or alkoxide methods have also been successfully employed to produce barium titanate powders. All of these aforementioned methods can produce fine submicron powders of near uniform size, but they are all hindered by such factors as the need for exotic manufacturing schemes, low product yields and/or the use of exotic or expensive precursor materials.

A "wet chemical" method for the manufacture of barium titanate that is well-known is discussed by Clabaugh, W. S., Swiggard, E. M., and Gilchrist, R., in the article entitled "Preparation of Barium Titanyl Oxalate Tetrahydrate for Conversion to Barium Titanate of High Purity," *Journal of Research of the National Bureau of Standards*, Vol. 56, No. 5, 1956, pp. 289-291. This basic process is currently employed by commercial manufacturers for the production of barium titanate. In this method of manufacture, barium titanyl oxalate is precipitated by the addition of a mixture of an aqueous solution of titanium tetrachloride and barium chloride to an aqueous solution of oxalic acid having a temperature of about 80° C. while stirring vigorously. The barium titanyl oxalate is then washed with distilled water and vacuum filtered. After drying in air the barium titanyl oxalate is ignited at a temperature in excess of about 900° C. to convert it to barium titanate. While this method is capable of producing barium titanate of high purity, this method does not yield barium titanate of fine, uniform particle size. In connection with this method Hennings et al. U.S. Pat. No. 5,009,876 discloses a method of producing barium titanate with primary particle size in the range of 0.2 μm to 0.5 μm by maintaining a reaction temperature of about 55° C. in an aqueous solution of titanium oxychloride and oxalic acid while an aqueous solution of barium chloride is added drop wise. This method produces a finer barium titanyl oxalate which ultimately leads to a finer, more uniform barium titanate when said oxalate is calcined.

SUMMARY OF INVENTION

The present invention provides a new and improved method for producing fine barium titanate powders from barium titanyl oxalate using barium carbonate, titanium oxychloride and oxalic acid. No barium chloride or barium nitrate is used in the method of the present invention. The barium titanate powders of the present invention may be utilized to produce a variety of electronic devices, such as, for example, capacitors and thermistors.

In a preferred embodiment, the powders of the present invention are produced by providing a solution comprising oxalic acid and titanium oxychloride dissolved therein, maintaining the solution at a temperature of from about 30° C. to about 90° C., adding barium carbonate to the solution thereby precipitating barium titanyl oxalate, and calcining the barium titanyl oxalate so as to provide the barium titanate powder.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

Figure 1A:
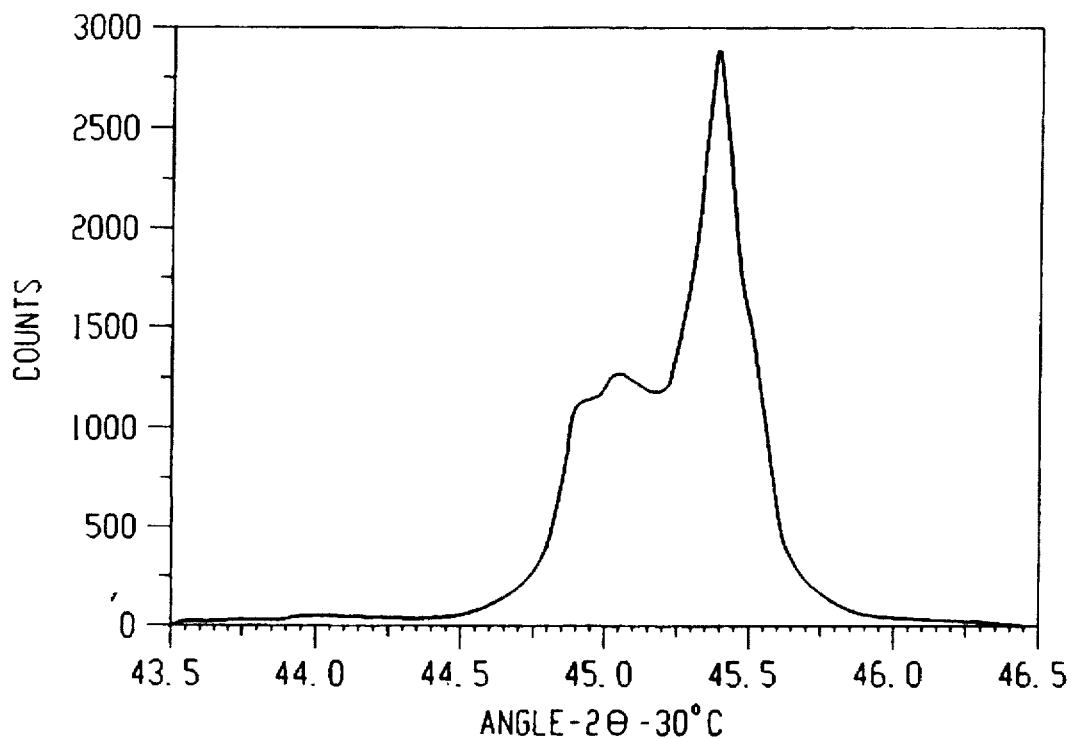
FIGS. 1A-1D illustrate X-ray diffraction data on barium titanate powders made in accordance with the present invention wherein the solution from which the barium titanyl oxalate was precipitated was held at the indicated temperatures of about 30° C., 40° C., 50° C. and 60° C.
Figure 1B:
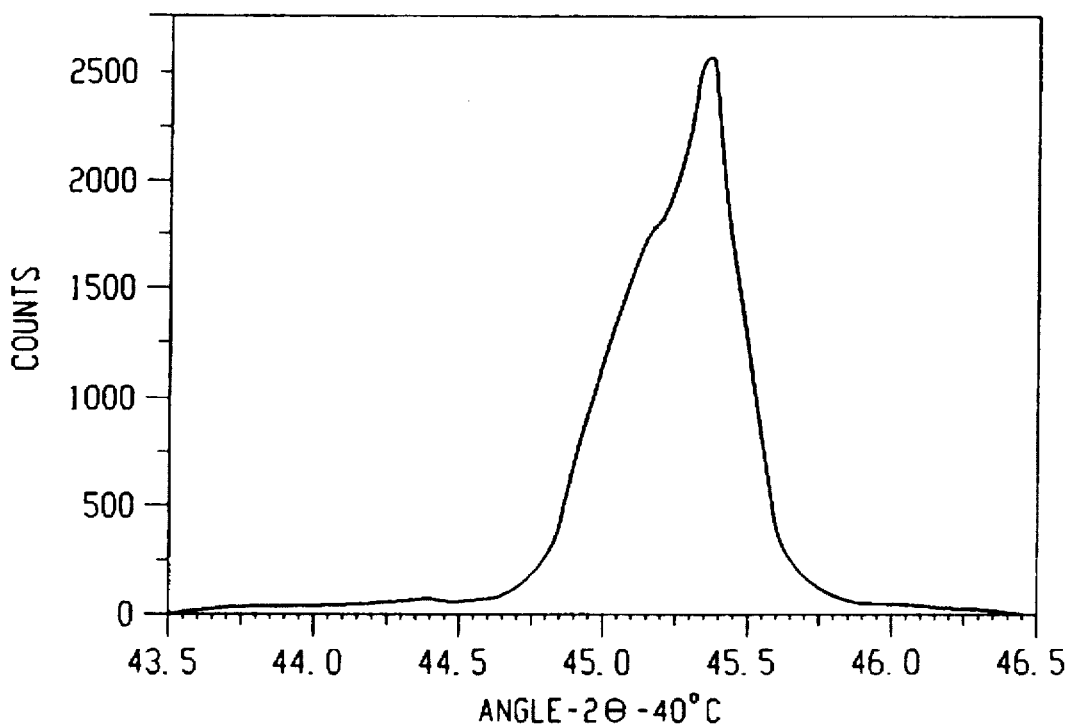
Figure 1C:
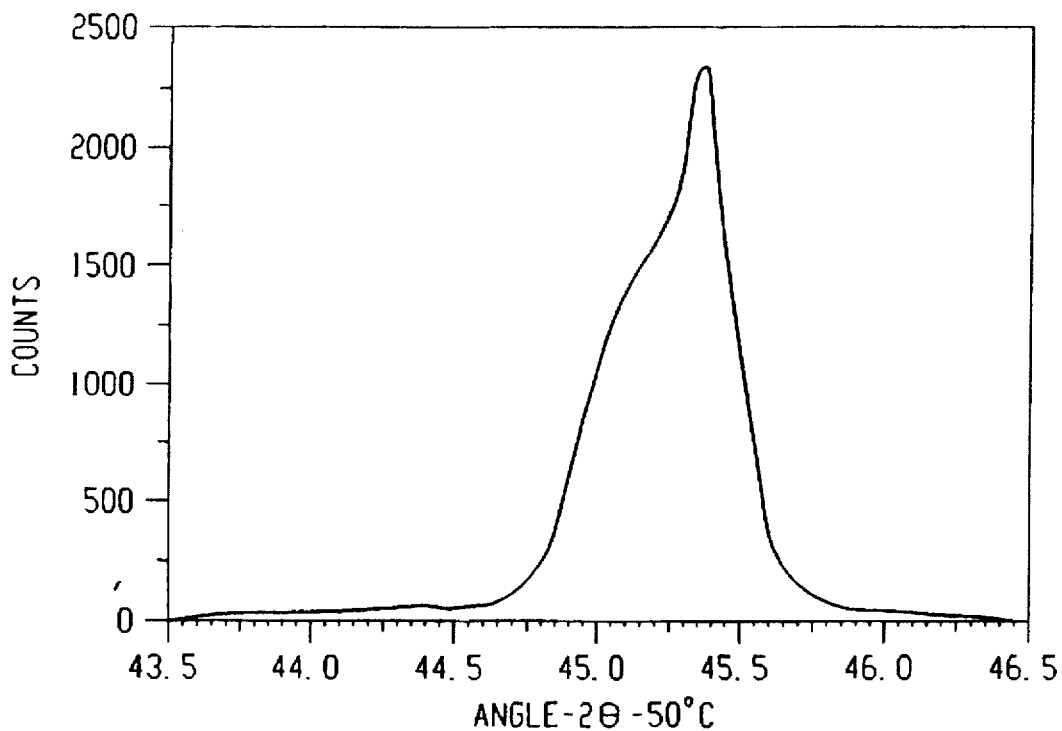
Figure 1D:
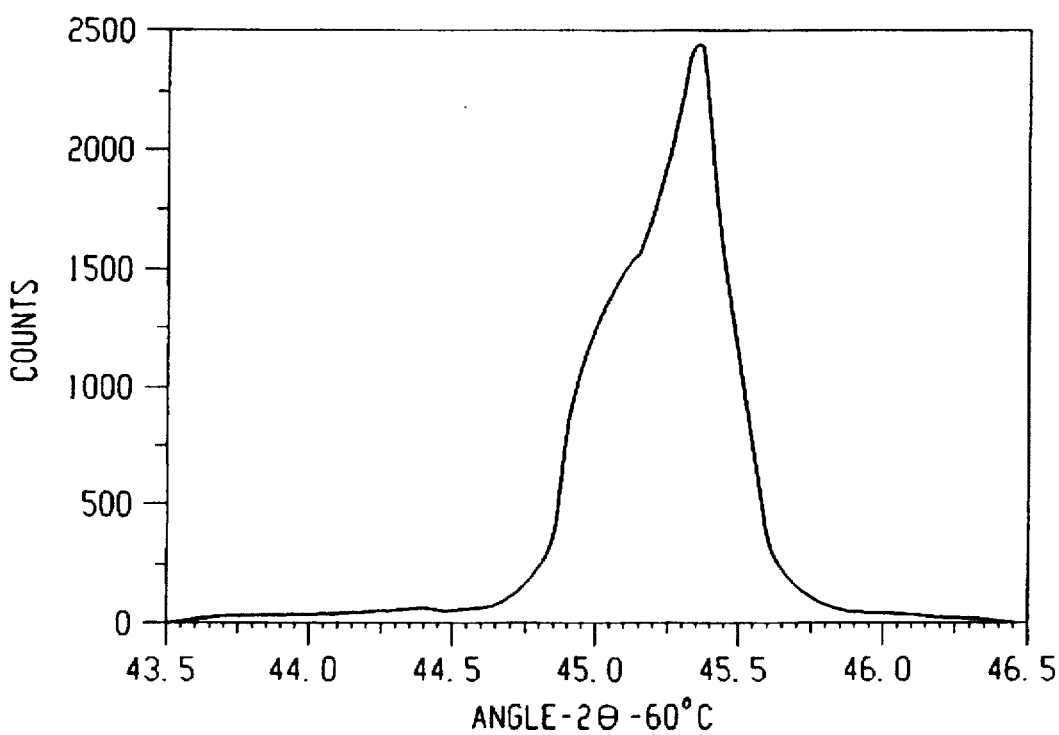
Figure 2A:
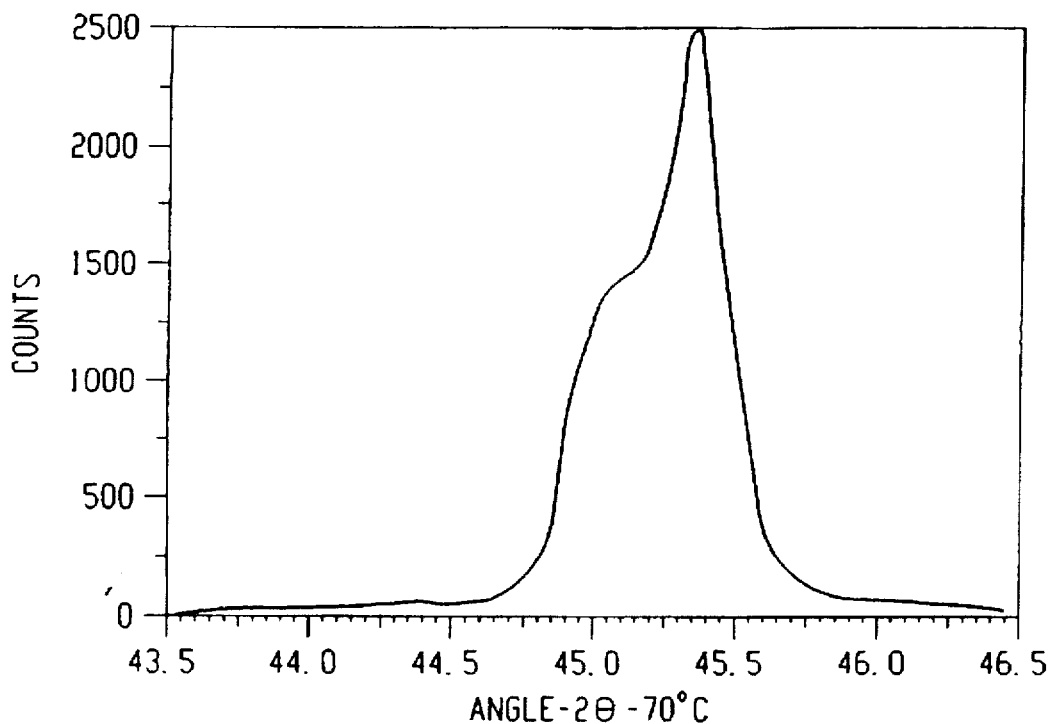
FIGS. 2A-2D illustrate additional X-ray diffraction data on barium titanate powders made in accordance with the present invention wherein the solution from which the barium titanyl oxalate was precipitated was held at the indicated temperatures of about 70° C., 75° C., 80° C. and 90° C.
Figure 2B:
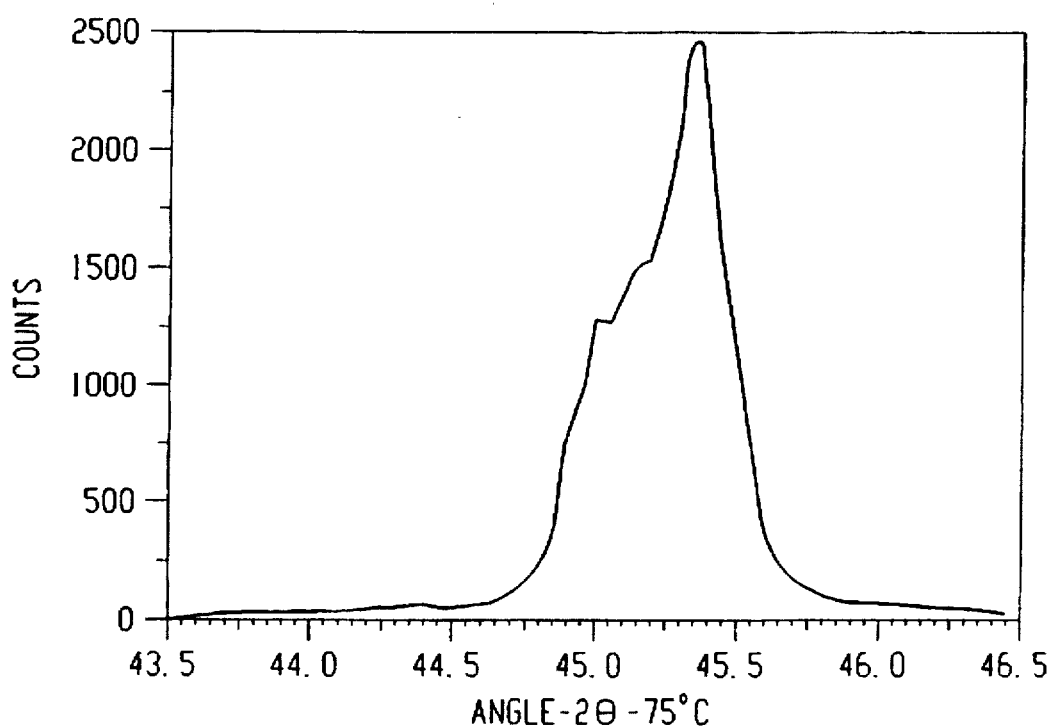
Figure 2C:
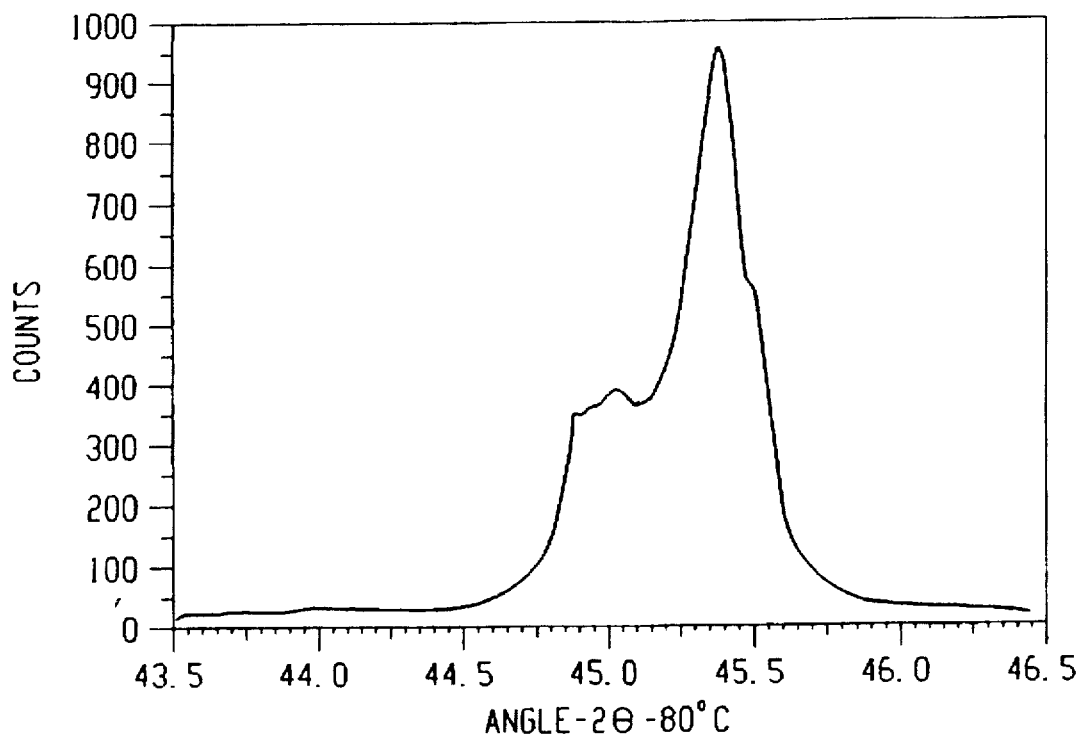
Figure 2D:
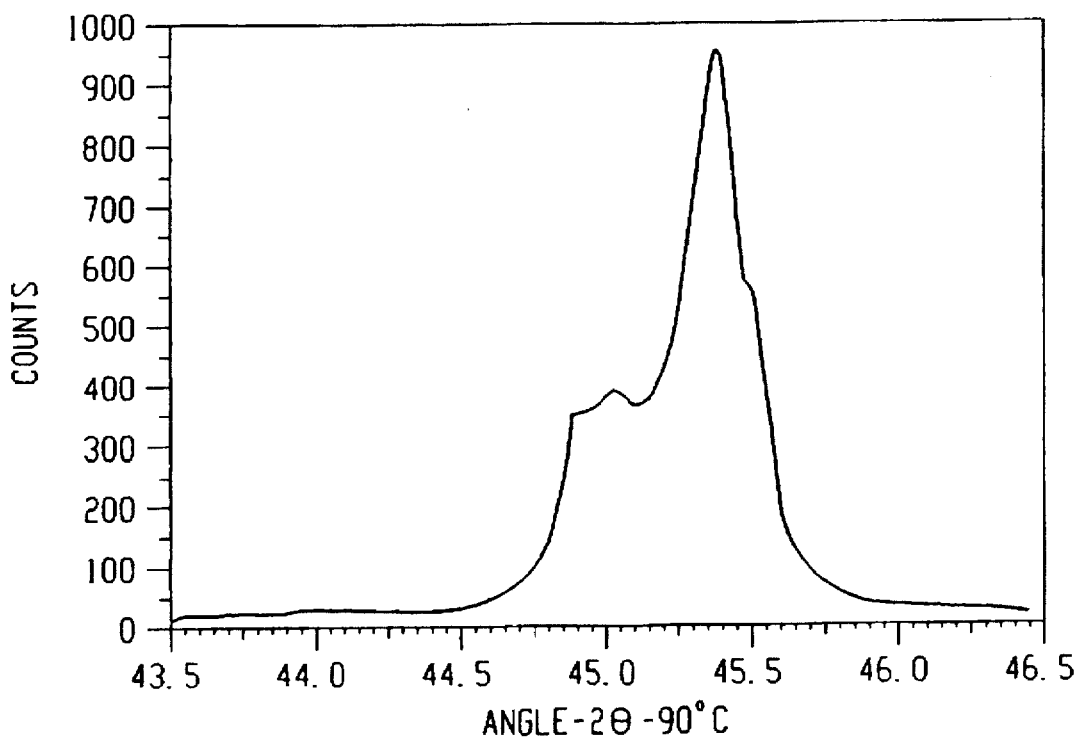
Figure 3A:
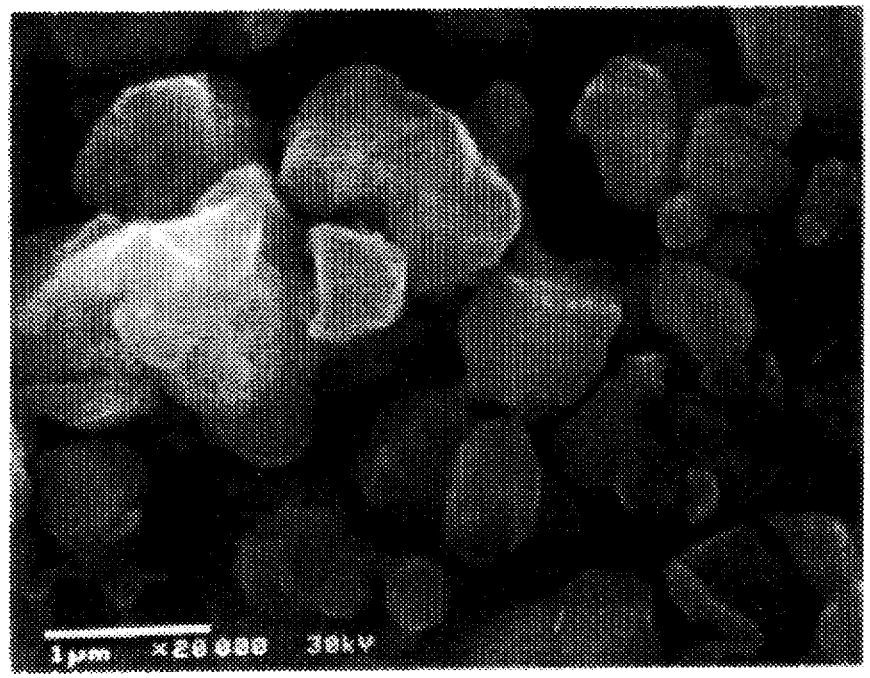
FIGS. 3A-3D are photomicrographs of barium titanate powders made in accordance with the present invention wherein the solution from which the barium titanyl oxalate was precipitated was maintained at the indicated temperatures of 30° C., 40° C., 50° C. and 60° C.
Figure 3B:
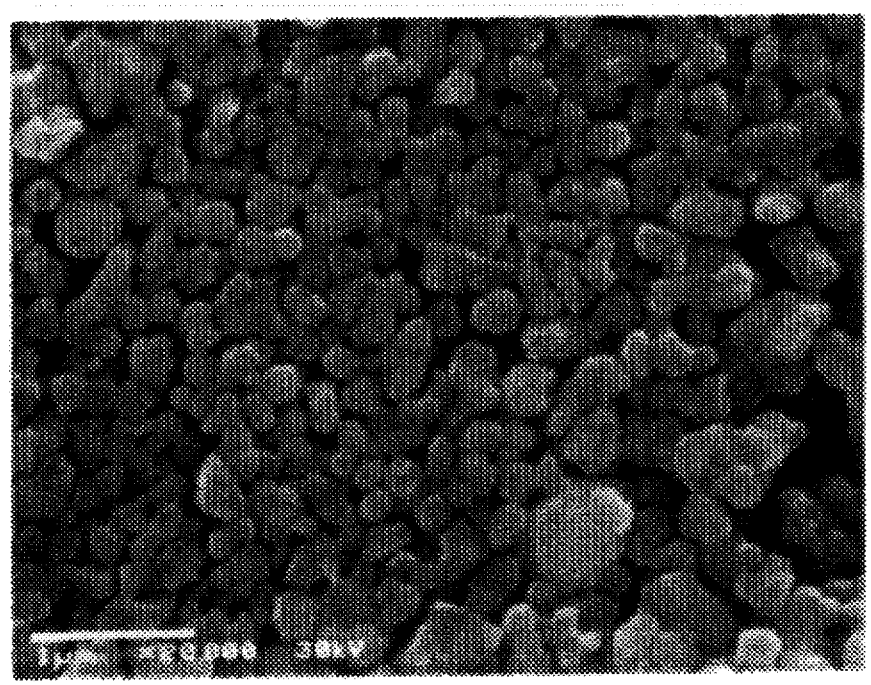
Figure 3C:
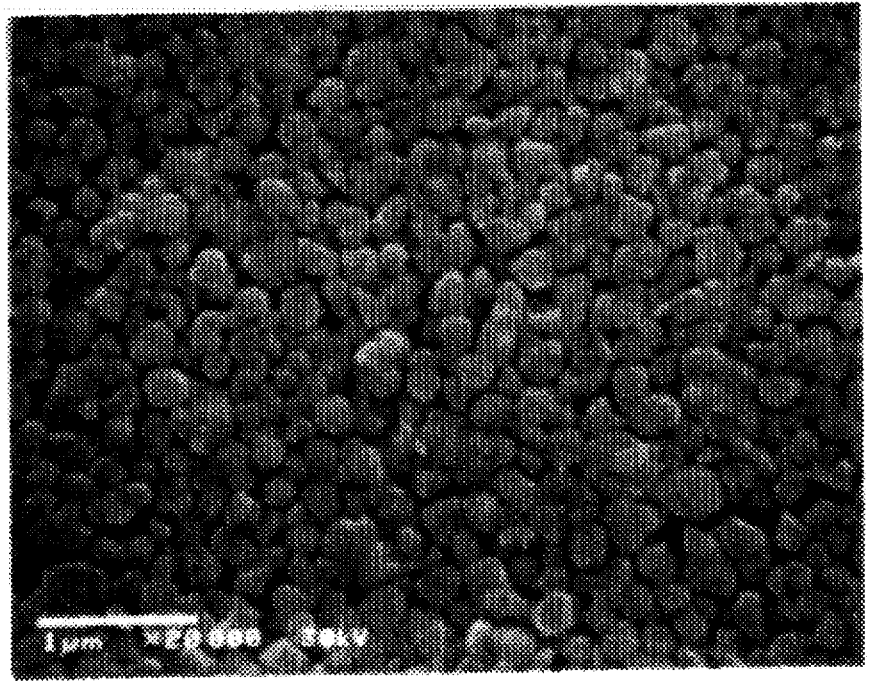
Figure 3D:
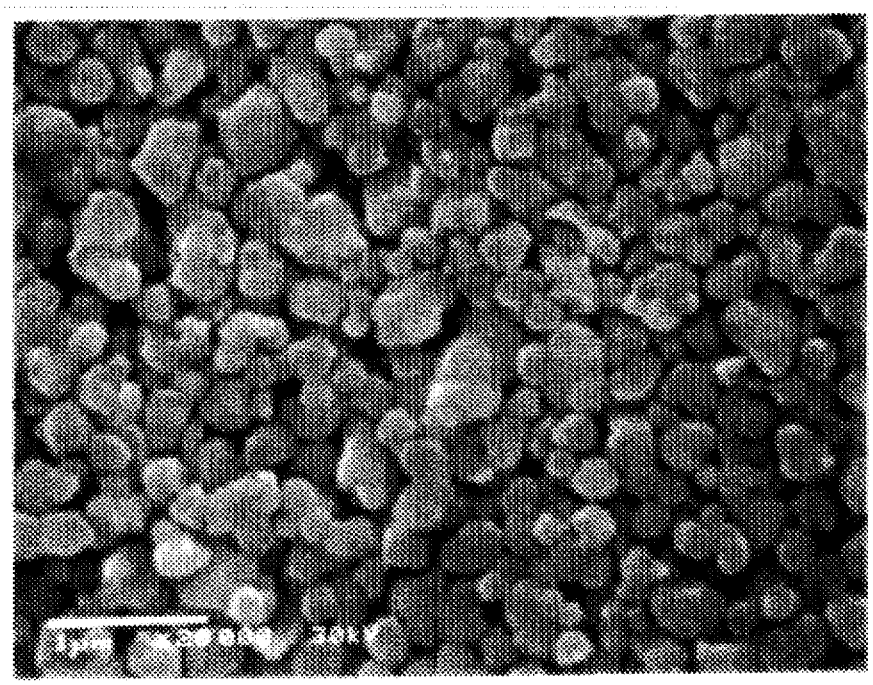
Figure 4A:
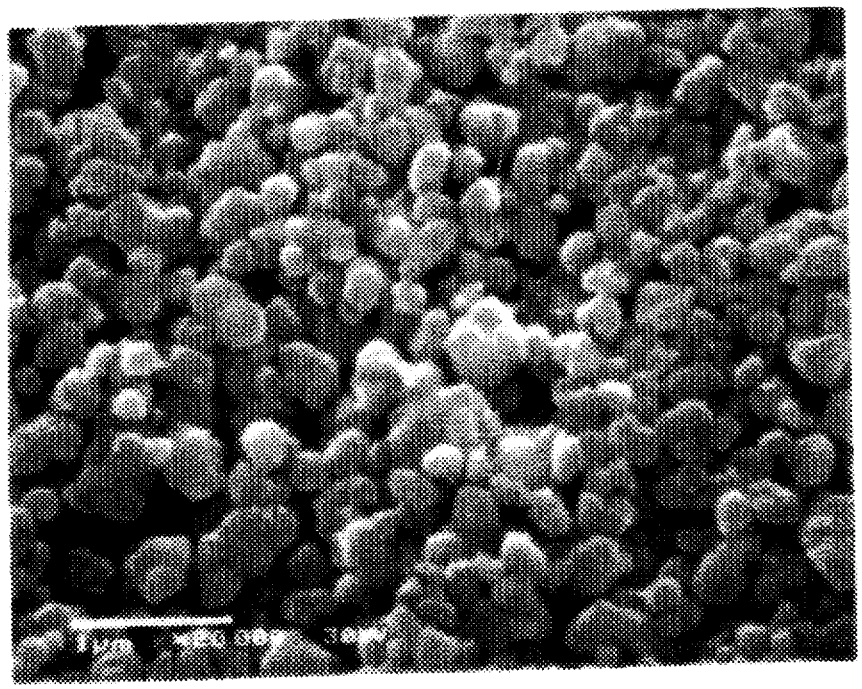
FIGS. 4A-4D are photomicrographs of barium titanate powders made in accordance with the present invention wherein the solution from which the barium titanyl oxalate was precipitated was maintained at the indicated temperatures of 70° C., 75° C., 80° C. and 90° C.
Figure 4B:
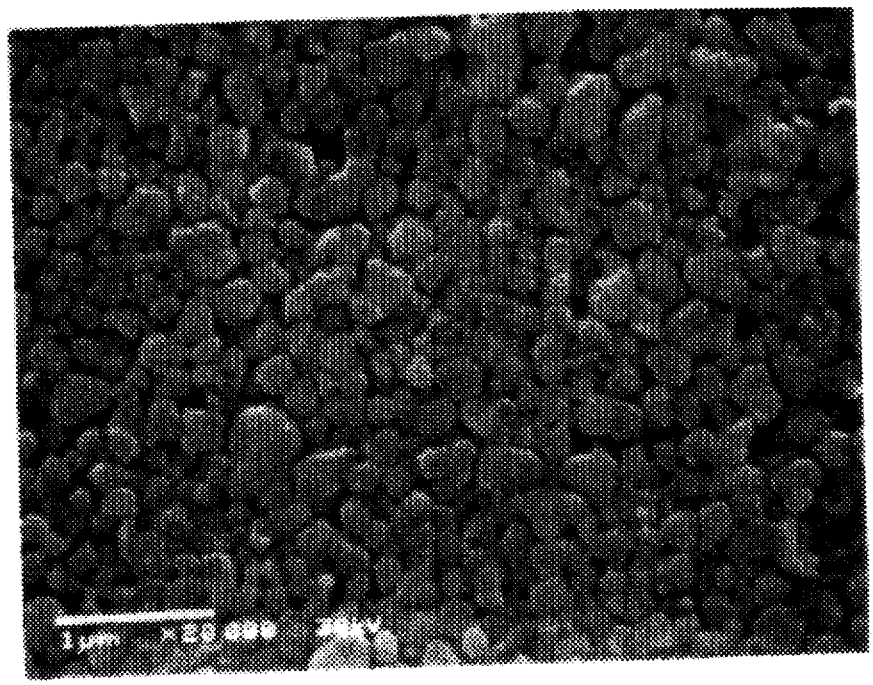
Figure 4C:
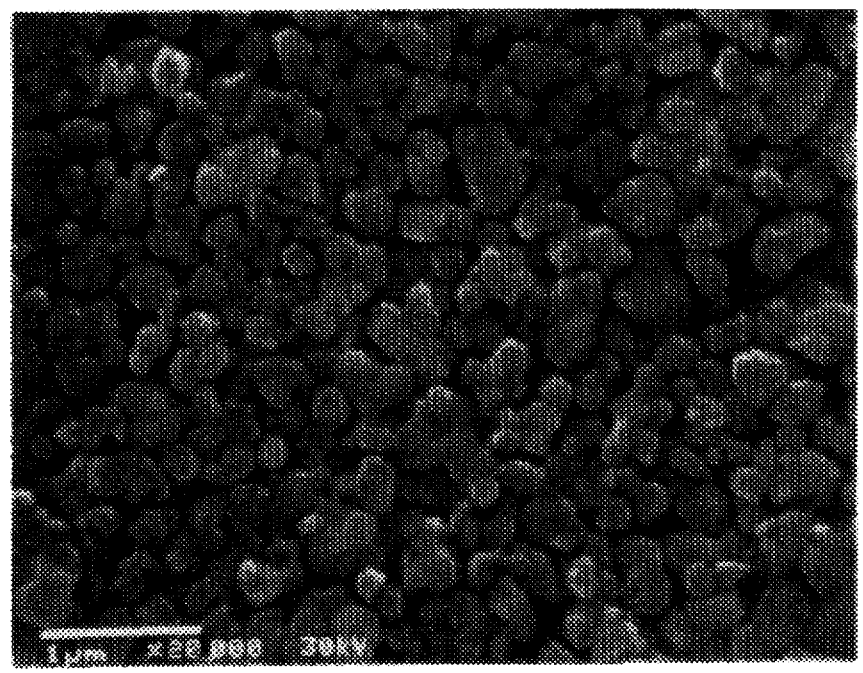
Figure 4D:
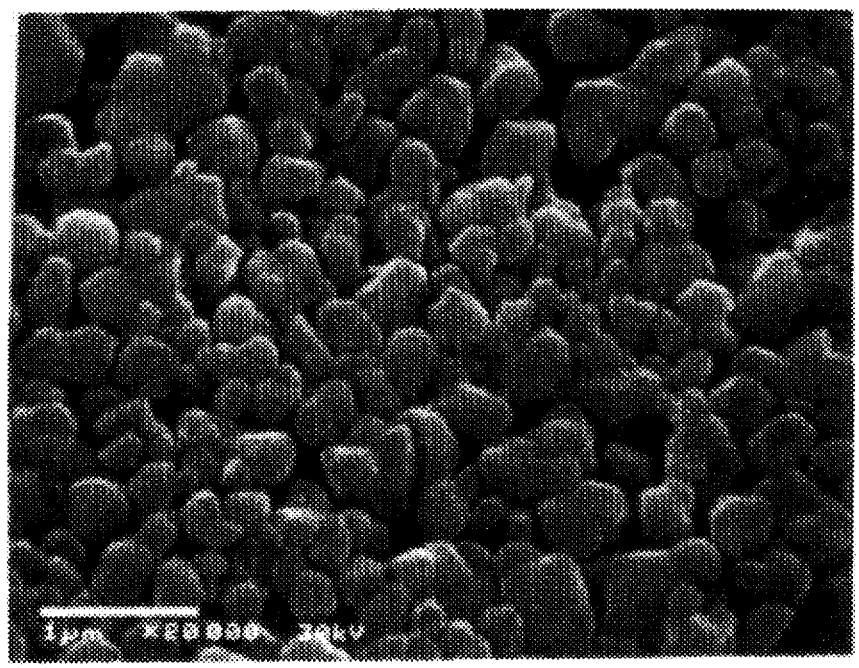

In some prior art methods as discussed above the barium source is barium chloride or barium nitrate, both soluble salts of barium. In the case of barium chloride, it is known that the presence of $Cl^-$ in the final barium titanate can lead to inferior ferroelectric properties. This is due to the ability of the $Cl^-$ ion to become incorporated in the barium titanate crystal structure. The temperature required to liberate this chlorine is higher than that of the temperature required to form barium titanate from the barium titanyl oxalate. Thus, if there are $Cl^-$ ions present in the barium titanate and the barium titanate is used to formulate an electronic ceramic material that has a firing temperature greater than the temperature required to liberate the $Cl^-$ ions, the microstructural integrity of the electronic device will be compromised during the evolution of the chlorine present.

However, applicants have unexpectedly found that the use of barium carbonate as the barium source helps to eliminate this potential chlorine contamination problem. Furthermore, applicants have found that it is also advantageous to use barium carbonate due to its cost effectiveness, and it is readily available in very large commercial quantities as well as being readily available as a very high purity form of barium.

In the various prior art methods discussed above, the barium salts are first put into an aqueous solution prior to being combined with the remaining materials to form the barium titanyl oxalate. This necessitates the use of multiple tanks for containing the raw materials. However, applicants have found that by using barium carbonate as the barium source one can limit to one the number of tanks required for producing the barium titanyl oxalate. This also reduces the number of manufacturing steps by not having to formulate a barium salt solution. This increased efficiency leads to a higher throughput of material and a corresponding decrease in cost.

The method of the present invention also provides a distinct advantage for it yields primary barium titanate particles in the range of 0.10 μm to 0.85 μm without the need for post calcination wet milling of the powder thus limiting the contamination of the final barium titanate product. More particularly, the present invention provides barium titanate powders having an average particle size of from about 0.20 μm to about 0.45 μm. Barium titanate powders in the range of from 0.20 μm to about 0.45 μm are of great interest to the current electronic components market.

The method of the present invention for manufacturing barium titanate powders includes the steps of forming a solution of barium titanyl oxalate by adding barium carbonate powder to an aqueous solution of titanium oxychloride and oxalic acid at a temperature range of from about 30° to about 90° C. while stirring vigorously with the precipitate being collected (e.g., by filtering) as barium titanyl oxalate and then calcined to form barium titanate. More particularly, the method includes the steps of forming an aqueous solution (preferably in deionized water) comprising from about 2.0 moles to about 2.5 moles of dissolved oxalic acid per 1 mole of titanium oxychloride and most preferably about 2.20 moles of oxalic acid to each mole of titanium oxychloride, maintaining the solution at from about 30° C. to about 90° C. and adding from about 0.975 moles to about 1.050 moles of barium carbonate, and most preferably about 1.0 moles of barium carbonate per mole of titanium oxychloride so as to precipitate out BaTiO $(C_2O_4)_2 \cdot 4H_2O$ which is a precursor to the barium titanate. The precursor is then washed in deionized water, filter pressed and then pyrolized or calcined at a temperature of from about 800° C. to about 1250° C. for a period of from about 1 hour to about 8 hours, and preferably at a temperature of from about 900° C. to about 1175° C. for a period of from about 2 hours to about 7 hours.

Samples of barium titanyl oxalate were produced at reaction temperatures of 30°, 40°, 50°, 60°, 70°, 75°, 80° and 90° C. These barium titanyl oxalate precipitates were washed with deionized water and vacuum filtered to produce a semidry filter cake. These filter cakes were loaded into aluminum oxide saggers and calcined at 1175° C. for five hours in a laboratory rapid temperature box kiln. The resultant barium titanate powders were then de-agglomerated by dry milling six minutes in a Spex® mill using zirconia grinding media of about 2 mm in diameter (this was a very short duration de-agglomeration where there was no actual milling taking place and subsequently no contamination of the barium titanate powders). Samples of these powders were examined, via X-ray diffraction, between the angles of 43.5° and 46.5° at 2⊖ to determine the effect of reaction temperature on the degree of peak splitting. The results of this X-ray data are shown in FIGS. 1A–1D and 2A–2D. At the reaction temperature of 30° C. the peak splitting is quite obvious while a 10° C. increase to 40° C produces a more cubic peak. As reaction temperature increases, the amount of peak splitting also increases with the degree of splitting at reaction temperatures of 80° C. and 90° C. being nearly identical to that at 30° C. Photomicrographs of these barium titanate powders were also taken using a scanning electron microscope as shown in FIGS. 3A–3D and 4A–4D. These pictures illustrate the effect of increasing the reaction temperature on the final particle size of the barium titanate powders and also establishes that a high degree of peak splitting (tetragonality) can be achieved while maintaining said fine particle size. The tetragonal form of barium titanate is preferred for it exhibits desirable ferroelectric properties.

The following example will serve to illustrate the novel features and advantages of the present invention. While this example will show one skilled in the art how to operate within the scope of this invention, it is not to serve as a limitation on the scope of the invention for such scope is only defined in the claims below.

EXAMPLE I

A barium titanyl oxalate solution was produced by the addition of dry barium carbonate powder to a solution containing titanium oxychloride and oxalic acid at a temperature above room temperature. The barium titanyl oxalate thus produced was then filtered, washed with deionized water and calcined at an elevated temperature (above 900° C.) to produce a high purity barium titanate with primary grains of uniform size. More particularly, a quantity of oxalic acid equaling 2.2 moles was mixed, with stirring to a volume of deionized water equaling 1200 milliliters at a temperature of about 68° C. The endothermic reaction of the dissolution of the oxalic acid caused a drop in the solution temperature to about 52° C. Stirring and heating of the solution were continued and when the temperature of the solution increased to 65° C., a commercially available titanium oxychloride solution of ≈50% containing 1.0 moles of $Ti^{+4}$ was added to the oxalic acid solution. This addition generated an exothermic reaction causing the temperature to increase to about 74° C. This mixture of oxalic acid and titanium oxychloride was allowed to mix five minutes at which point a quantity of barium carbonate equaling 1.0 moles of $Ba^{+2}$ was added as fast as the rate of the reaction allowed (about seven minutes). After the completion of the barium carbonate addition the temperature of the resultant slurry was about 76° C. This slurry was allowed to stir for one hour maintaining a temperature of about 75° C. At the end of one hour of stirring at about 75° C. the heat and stirring were removed and the precipitated barium titanyl oxalate was allowed to settle and cool for about 16 hours (if the resultant precipitate is filtered at this point in time, without cooling, a small portion of the barium titanyl oxalate will be in a soluble form and the resultant yield will be lower than expected). The barium titanyl oxalate was then washed with deionized water and vacuum filtered through a #41 Whatman® filter paper and Büchner funnel producing a semidry cake. The filter cake was calcined at 1125° C. for five hours and then passed through a compressed air Sturtevant® jet mill for powder de-agglomeration. The de-agglomerated powder was measured for various physical properties:

| Surface area | 2.98 $m^2$/gram |
| --- | --- |
| Tapped bulk density | 1.041 gram/cc |
| Acetic acid soluble BaO | 0.89% |
| Loss on ignition at 1000° C. | 0.17% |

Figure 5:
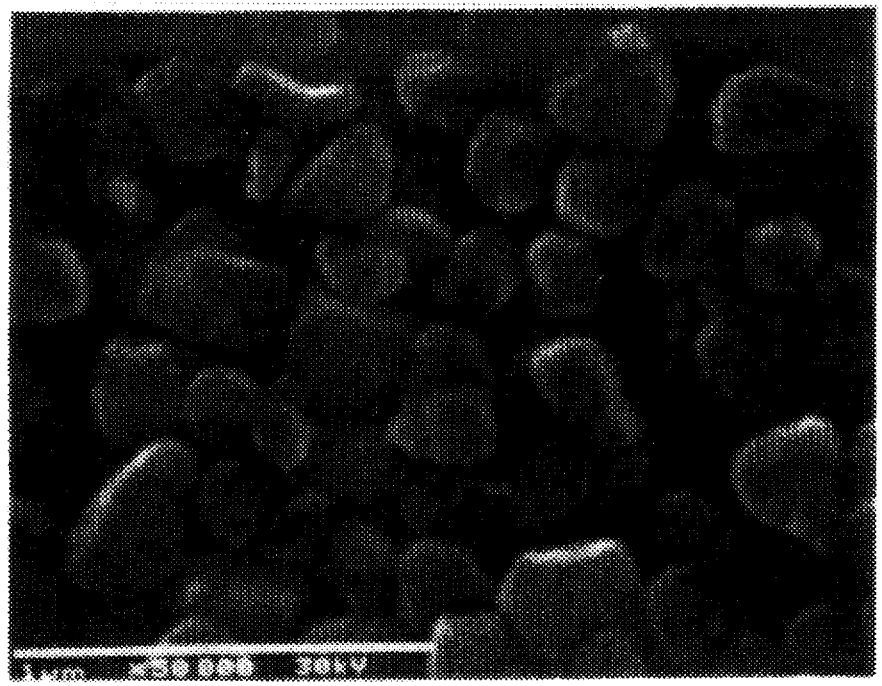
FIG. 5 is a photomicrograph of the barium titanate powder of Example I.

A 2 gram sample of the above barium titanate powder was dispersed in methanol in an ultrasonic bath, dripped onto an electron microscope stub and photomicrographed via a scanning electron microscope. FIG. 5 is a view of such photomicrograph. This photomicrograph illustrates the fine size and uniformity of the primary barium titanate grains.

By the present inventive method, fine, uniform grain size barium titanate powders can be manufactured using one reaction tank. Easily handled, widely accessible, cost-effective and high purity barium carbonate can be used as the barium source. Excessive milling with attritor-type mills such as those disclosed in Hennings et al., U.S. Pat. No. 5,000,876 and the accompanying contamination are not necessary to achieve a very uniform fine grain size barium titanate powder.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A method of producing barium titanate powder comprising the steps of:

A. Providing a solution comprising oxalic acid and titanium oxychloride;

B. Maintaining said solution at a temperature of from about 30° C. to about 90° C.;

C. Adding barium carbonate to said solution thereby precipitating barium titanyl oxalate; and D. Calcining said barium titanyl oxalate so as to provide said barium titanate powder.

2. A method as set forth in claim 1 wherein said calcination step D is conducted at a temperature of from about 800° C. to about 1250° C. for a period of from about 1 to about 8 hours.

3. A method as set forth in claim 1 wherein said barium titanate powder displays a particle size of from about 0.10 μm to about 0.85 μm.

4. A method as set forth in claim 1 wherein said solution of said step A is formed using deionized water.

5. A method as set forth in claim 1 wherein said solution is vigorously mixed while adding said barium carbonate during said step C.

6. A method as set forth in claim 1 wherein after said step C said barium titanyl oxalate is collected from said solution.

7. A method as set forth in claim 5 wherein said barium titanyl oxalate is collected by filtering.

8. A method of producing barium titanate powder comprising the steps of:

A. Providing a solution comprising from about 2.0 moles to about 2.5 moles of oxalic acid per mole of titanium oxychloride;

B. Maintaining said solution at a temperature of from about 30° C. to about 90° C.;

C. Adding barium carbonate to said solution thereby precipitating barium titanyl oxalate; and D. Calcining said barium titanyl oxalate so as to provide said barium titanate powder.

9. A method as set forth in claim 8 wherein said solution of step A comprises about 2.2 moles of oxalic acid per mole of titanium oxychloride.

10. A method as set forth in claim 8 wherein about 1 mole of barium carbonate is added to said solution during said step C for every mole of titanium oxychloride contained in said solution.

11. A method of producing barium titanate powder comprising the steps of:

A. Providing a solution comprising oxalic acid and titanium oxychloride;

B. Maintaining said solution at a temperature of from about 30° C. to about 90° C.;

C. Adding barium carbonate to said solution at a rate of from about 0.975 moles to about 1.050 moles of said barium carbonate for every 1 mole of said titanium oxychloride contained in said solution thereby precipitating barium titanyl oxalate; and D. Calcining said barium titanyl oxalate so as to provide said barium titanate powder.

* * * * *